United States Patent

[11] 3,577,019

[72] Inventor Herbert F. Storm
Delmar, N.Y.
[21] Appl. No. 762,091
[22] Filed Sept. 24, 1968
[45] Patented May 4, 1971
[73] Assignee General Electric Company

[54] INSULATED GATE FIELD EFFECT TRANSISTOR USED AS A VOLTAGE-CONTROLLED LINEAR RESISTOR
4 Claims, 7 Drawing Figs.

[52] U.S. Cl. .......... 307/304,
307/262, 317/33, 323/110
[51] Int. Cl. .......... H03k 3/26
[50] Field of Search .......... 307/304, 205, 251, 279, 262; 317/235 (21.2), 235 (21), 33; 323/110

[56] References Cited
UNITED STATES PATENTS

| | | | |
|---|---|---|---|
| 3,131,312 | 4/1964 | Putzrath .......... | 307/304X |
| 3,311,756 | 3/1967 | Nagata et al. .......... | 307/304 |
| 3,333,115 | 7/1967 | Kawakami .......... | 307/304 |
| 3,408,511 | 10/1968 | Bergersen et al. .......... | 307/304X |

OTHER REFERENCES

IBM Technical Disclosure Bulletin Vol. 7, No 1, June 1964, by W. Y. Elliott, Jr., titled FIELD EFFECT TRANSISTOR AS A LINEAR VARIABLE RESISTANCE, p 111. A copy is located in class 307 subclass 304 in Art Unit 254.

*Primary Examiner*—Stanley T. Krawczewicz
*Attorneys*—John F. Ahern, Paul A. Frank, Donald R. Campbell, Frank L. Neuhauser, Oscar B. Waddell and Melvin M. Goldenberg

ABSTRACT: The channel resistance of a metal-oxide-semiconductor field-effect transistor, or other insulated gate field effect transistor, is linearized by applying to the gate electrode, in addition to the gate voltage for controlling the conductivity, an external feedback voltage having a value of one-half the supply voltage to nullify the effect of the internal feedback due to the supply voltage. In some cases the base electrode is disconnected, but spurious effects caused thereby can be avoided. The voltage-controlled linear resistor can be employed in DC and AC circuits in applications such as an AC phase shift circuit.

Inventor:
Herbert F. Storm,
by Donald R. Campbell
His Attorney.

INSULATED GATE FIELD EFFECT TRANSISTOR USED AS A VOLTAGE-CONTROLLED LINEAR RESISTOR

This invention relates to the use of an insulated gate field-effect transistor as a solid-state voltage-controlled resistive element, and more particularly to an arrangement for linearizing the resistance of an insulated gate field-effect transistor.

Various properties of the insulated gate field-effect transistor, and especially of the well-known metal-oxide-semiconductor field-effect transistor (MOS-FET)-type of insulated gate field-effect transistor, make it desirable for use in solid-state circuits as a voltage controlled resistor. The insulated gate field-effect transistor essentially comprises a body of semiconductor material between source and drain electrodes, and a gate electrode overlying and insulated from the semiconductor body to which a voltage is applied to control the majority carrier flow in a channel created between the source and drain electrodes. It is the channel resistance that is employed as the circuit resistive element. The range of channel resistance depends on the dimensions of the channel and on the materials and processes for fabricating the device, and typical values for channel resistance are from megohms to hundreds or tens of ohms. The insulated gate field-effect transistor can be fabricated by integrated circuit techniques, and offers simpler processing, smaller space requirements, and lower cost per bit than the bipolar transistor. They further can have a resistivity at least two orders of magnitude higher than is obtainable with ordinary, diffused resistors. These and other properties of the insulated gate field-effect transistor suggest it for numerous applications as a solid-state voltage-controlled resistor in equipment such as long-time timers, variable RC time-constant circuits, voltage controlled attenuators, adaptive controls, multipliers, flip-flops, memories, and many forms of amplification and modulation. A disadvantage, however, and a limitation to wide usage, is that the channel resistance is nonlinear, where channel resistance is defined as the ratio of the voltage across the channel to the current flowing through the channel. There are many applications including the above, and particularly AC applications, where an electrically controllable resistor would be useful, but its resistance should be independent of the direction and magnitude of the voltage and current. In short, the controllable resistance should be linear.

Accordingly, an object of the invention is to provide a technique for linearizing the channel resistance of an insulated gate field-effect transistor.

Another object is the provision of a new and improved relatively simple solid-state linear voltage controlled resistive device comprising an insulated gate field-effect transistor modified by suitable circuitry so as to have a linear resistance.

Yet another object is to provide a new and improved AC phase-shift circuit employing as the variable resistance an insulated gate field-effect transistor connected as a linear resistor.

In accordance with the invention, the new voltage-controlled linear resistance device comprises an insulated gate field-effect transistor, preferably a metal-oxide-semiconductor field-effect transistor, having first and second electrodes between which a supply voltage is applied and a gate electrode to which a gate voltage is applied to control the conductivity of the channel in the semiconductor body that extends between the first and second electrodes. An impedance is connected between the first and second electrodes, and the midpoint of the impedance is coupled to the gate electrode to thereby apply to the gate electrode an external feedback voltage equal to one-half of the supply voltage applied between the first and second electrodes. The external feedback voltage is equal and opposite in polarity to the internal feedback voltage caused by the supply voltage, and thus nullifies its effect. To avoid the deleterious effects of an unconnected base electrode which is sometimes required to linearize the channel resistance, the base electrode can be connected to one or both of the first and second electrodes by a resistor or capacitor. The supply voltage can be a DC source or an AC source, and an illustratory application is an AC phase-shift circuit.

The foregoing and other objects, features, and advantages of the invention will be apparent from the following more particular description of several preferred embodiments of the invention, as illustrated in the accompanying drawings wherein.

Figure 1:
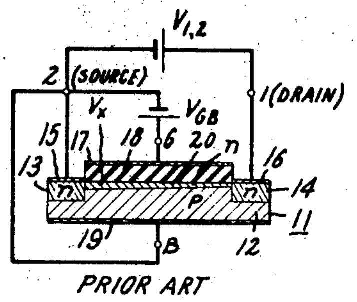
FIG. 1 is a cross-sectional view of an N-channel metal-oxide-semiconductor (MOS) field-effect transistor showing the usual connection with a DC supply as a nonlinear resistance element.

In order to understand the causes of the nonlinearity of channel resistance when an insulated gate field-effect transistor is connected in a circuit as a resistance element according to the prior art methods, FIG. 1 shows by way of illustration an N-channel enhancement mode metal-oxide-semiconductor field-effect transistor arranged in the usual manner in a DC circuit. This form of insulated gate field-effect transistor is well known in the art and will be described only briefly. The device 11 is formed at one surface of a P-type substrate 12 made of silicon or other suitable semiconductor material and comprises two spaced regions 13 and 14 of heavily doped N-type silicon providing respectively the source and drain electrodes. Ohmic metallic contacts 15 and 16 respectively overlie the source electrode 13 and drain electrode 14 and are connected to the opposite terminals of a supply of source-to-drain voltage here identified as $V_{1,2}$. A metallic gate electrode 17 is deposited on a layer of insulating material 18 of silicon dioxide, for example, which in turn overlies the surface of the substrate 12 between the source electrode 13 and drain electrode 14. In similar manner a metallic contact 19 is deposited on the other side of substrate 12, and a source of gate-to-base voltage $V_{GB}$ is connected between the gate terminal G and base terminal B. The gate electrode is interconnected with or referenced to the source electrode, thereby by definition establishing the electrode 13 as the source electrode. Hereafter, the electrodes 14 and 13, or more exactly the terminals connected thereto, will be referred to respectively as supply terminals 1 and 2, since it will be shown later that the device 11 can be operated as a resistance element in an AC circuit wherein an AC voltage is applied between the supply terminals 1 and 2. The application of a gate-to-base voltage of the appropriate polarity in FIG. 1 creates an electric field which attracts electron charge carriers from the body of the substrate 12 to its surface, thereby creating an N-channel 20 between the electrodes 13 and 14. The surface of the substrate is now changed from the previous nonconducting NPN configuration to an NNN configuration, and a substantial current can flow between supply terminals 1 and 2. Increasing the $V_{GB}$ produces more electrons in the channel and its resistance decreases. Thus, by varying $V_{GB}$, the channel resistance R, and its reciprocal, the channel conductance G, can be controlled. It will be recognized that there are N-channel and P-channel MOS transistors, and either may be made in an enhancement-type in which there is no channel for $V_{GB}$=0, or a depletion-type which have a channel for $V_{GB}$=0. The following considerations apply to any of these types.

It can be shown by mathematical analysis that the channel conductance $G_o$ is determined by the product of a basic performance factor F and the absolute value of the effective gate-to-base voltage $V_{GB(E)}$, where the effective gate-to-base voltage is simply $V_{GB}$ corrected to exclude the threshold voltage of the device, i.e., $G_o=F|V_{GB(E)}|$. When a DC supply voltage $V_{1,2}$ is applied between the supply terminals 1 and 2 in FIG. 1, it is found that the actual channel conductance G is not linear and depends on something in addition to the value of the effective gate-to-base voltage. This is because the potential between supply terminals 1 and 2 establishes intermediate values of electric field along the channel which modify the electric field originally created by the gate-to-base source $V_{GB}$. The modifying effect is called internal feedback or channel reaction. It is of electrostatic nature, and can be positive or negative. One major reason for the nonlinearity of the insulated gate field-effect transistor is the internal feedback.

The extent to which the channel conductance $G_o$ is affected by the internal feedback due to the applied supply voltage $V_{1,2}$ can be determined intuitively. It might be assumed that the internal feedback voltage would be zero at one end of the channel and $V_{1,2}$ at the other end of the channel, hence the average effect along the channel is $\frac{1}{2}V_{1,2}$. A more elaborate analysis verifies that this is the correct answer. The channel conductance of P-channel or N-channel devices is then given by the following expression, which is nonlinear: $G=F|V_{GB(E)}-\frac{1}{2}V_{1,2}|$. In this equation $V_{1,2}$ is a signed quantity. With the polarity of the supply voltage $V_{1,2}$ as shown in FIG. 1, the channel potential weakens the electric field set up by $V_{GB(E)}$ and results in negative internal feedback. The channel conductivity is reduced, and this causes a narrowing of the channel as is illustrated diagrammatically by a narrowing toward the right. If $V_{1,2}$ were reversed in polarity, as would be the case during one-half cycle if $V_{1,2}$ were an AC supply voltage, then the internal feedback would be positive since it strengthens the electric field set up by $V_{GB(E)}$, causing an increase in the channel conductivity. In this case, the channel narrows toward the left.

The determination as to whether the internal feedback is positive or negative can also be ascertained by the relative signs of the supply voltage $V_{1,2}$ and the effective gate voltage $V_{GB(E)}$ for the above equation for channel conductance G. When the signs of the $V_{1,2}$ and $V_{GB(E)}$ are the same, the supply voltage $V_{1,2}$ exerts a negative feedback. In the case that the supply voltage exceeds the effective gate-to-base voltage, it can be shown that the MOS transistor operates in the saturation or pinchoff region, and the linearization of the channel resistance in the manner to be explained later cannot be obtained. When the signs of the $V_{1,2}$ and $V_{GB(E)}$ are opposite, then the internal feedback becomes positive. Although there is no danger in operating in the saturation or pinchoff region, when there is positive internal feedback, the validity of the above equation may be impaired by another cause. This other cause is a current in shunt with the channel 20, flowing through the forward biased PN diode junction between terminals 1 and B in FIG. 1. When the junction bias exceeds the value at the knee of the forward diode characteristic, the bypass current may become large enough to invalidate the above equation.

There are in summary, two causes for the nonlinearity of channel resistance of an insulated gate field-effect transistor. These are (1) the internal, electrostatic feedback voltage having a magnitude of one-half of the supply voltage or terminal voltage applied between the terminals 1 and 2 of the device, and (2) the bypass current flowing between one of the supply terminals and the base terminal, or vice versa depending upon whether the insulated gate field-effect transistor is an N-channel or P-channel device.

In accordance with the invention, the internal electrostatic feedback is nullified by introducing an external feedback voltage having an effect which is equal and opposite to the internal feedback voltage. This can be accomplished by a simple circuit addition to the insulated gate field-effect transistor. When the bypass current between one of the supply terminals 1 and 2 and the base terminal B becomes excessive, this cause of nonlinearity can be eliminated by simply disconnecting terminal B so that the substrate has a floating potential. The floating substrate does not damage the linearity of the insulated gate field-effect transistor when modified to have a linear channel resistance, but it does result in a reduction of the performance factor F, and in a change of the threshold voltage. In the event that these effects or other spurious effects caused by the floating substrate become objectionable, it will be shown that these effects or other spurious effects may be compensated for by relatively simple circuit additions.

Figure 2:
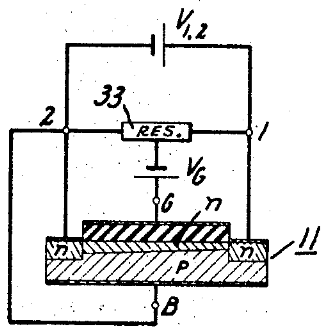
FIG. 2 is a view similar to FIG. 1 illustrating one arrangement for connecting the MOS transistor as a linear resistor.

FIG. 2 shows a circuit connection for providing the external feedback voltage for linearizing the channel resistance by connecting a center-tapped resistor 33 (or a resistive voltage divider comprising a pair of equal resistors) between the supply terminals 1 and 2, the center tap being connected to the gate electrode G through a source of gate voltage $V_G$. The device shown in FIG. 2 is similar to the circuit already described with respect to FIG. 1, but this arrangement provides for applying to the gate electrode G an additional voltage of $\frac{1}{2}V_{1,2}$ to exactly compensate for the internal feedback voltage that is a major cause of the nonlinearity. In this arrangement it is not necessary to disconnect the base electrode B as long as $V_{1,2}$ has the polarity shown. In FIG. 2, the supply voltage $V_{1,2}$ and the effective gate-to-base voltage $V_{GB(E)}$ have the same sign, and the internal feedback voltage (which is a negative feedback) from the equation previously given is $-\frac{1}{2}V_{1,2}$. Hence, the center-tapped resistor 33 whose resistance midpoint is connected to the gate electrode G via the gate control voltage $V_G$ provides the desired cancelling effect of $+1/2V_{1,2}$. The positive external feedback causes a uniform increase in channel depth. The net effect is as illustrated, where the channel depth still decreases from right to left, but the channel depth at any one point is larger than in FIG. 1. As a consequence, the channel conductance G is now the same as if the channel depth were uniform, the same as it would be if there is no negative feedback. The arrangement neutralizes the internal negative feedback effect, and the conductivity of the channel is independent of the supply voltage $V_{1,2}$ and is linear. The net channel conductance G is now a linear function of the effective gate voltage $V_{G(E)}$. If the polarity of $V_{1,2}$ were reversed, then a bypass current previously mentioned may flow from terminal B to terminal 1 because the P-type substrate and N-type electrode form a forward biased diode junction. To avoid this bypass current the connection between terminals 2 and B can be removed without changing the basic feedback neutralization of the circuit. The circuit is now totally symmetrical with respect to terminals 1 and 2. It therefore makes no difference which polarity the source $V_{1,2}$ has, and hence the circuit will function as well for alternating current.

Figure 3:
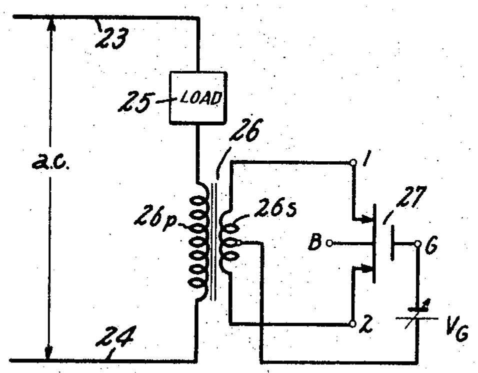
FIG. 3 is a schematic circuit diagram of a variable impedance circuit employing an MOS transistor connected in another way to function as a linear resistor.

FIG. 3 shows the application of a linearized insulated gate field-effect transistor as a variable impedance in an AC circuit. In order to enable the variable impedance to be at a different voltage lever, a transformer is inserted into the circuit whose secondary winding is connected to the variable impedance. This method not only separates the two circuits, but it also allows the utilization of the transformer as an impedance matching device. The separation of circuits is also important to prevent voltage surges from the power system from affecting the MOS transistor circuit, which are sensitive to surges. The control circuitry of the MOS transistor is also independent of the voltage levels of the power circuit. There is connected across the AC supply terminals 23 and 24 the series circuit comprising an impedance 25 (such as a capacitor) and the primary winding **26*p* of a linear transformer 26. Across the secondary winding 26*s* are connected the supply terminals 1 and 2 of an MOS field-effect transistor 27. The MOS transistor 27 may be either the N-channel or the P-channel type, and can be either an enhancement mode-type or a depletion mode-type. The device 27** may also be another type of insulating gate field-effect transistor known as the thin film transistor. The thin film transistor commonly comprises an evaporated thin film of semiconductor such as cadmium sulfide with a control gate insulated from the semiconductor and is described more fully, for instance, in the Proceedings of the IRE, June 1962, pp. 1462—1469.

In order to operate as a linear resistor, the base electrode B of the transistor 27 is left unconnected as previously explained. Furthermore, a compensating external feedback voltage is applied to the device by connecting the gate electrode G through a variable source of gate voltage $V_G$ to the center tap of the secondary winding 26*s*.

Figure 4:
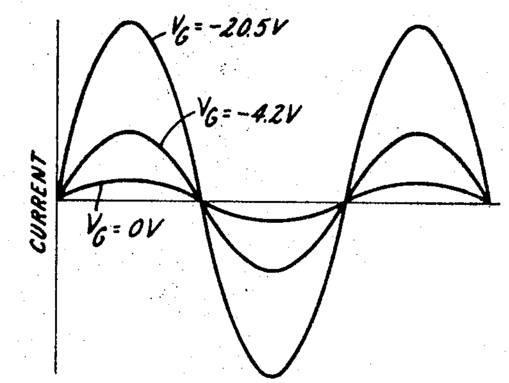
FIG. 4 shows a series of curves of output current vs. time for the FIG. 3 circuit, for different values of gate voltage.

The MOS field-effect transistor 27 will be assumed to be an enhancement mode-type. With zero gate voltage $V_G$, the transistor 27 is nonconducting and the primary winding 26*p* represents a high impedance to the AC circuit to be controlled. As the gate voltage is increased, the channel conductance between terminals 1 and 2 declines progressively, and as a result the primary winding 26*p* of the transformer 26 presents a reduced impedance. Thus, more current flows through impedance 25. Because of the center tap connection of the gate electrode G to the secondary winding 26*s*, a voltage having a magnitude of one-half of the voltage applied between terminals 1 and 2 is applied to the gate electrode, and compensates for the internal electrostatic feedback in each half cycle. This, in conjunction with the unconnected base terminal B, linearizes the channel resistance of the device 27. Therefore, the impedance controlling the current supplied to impedance 25 is also linear, and there is no wave shape distortion occurring in the primary circuit as is evident in FIG. 4 where the output current is plotted against time for a number of different gate voltages.

Figure 5:
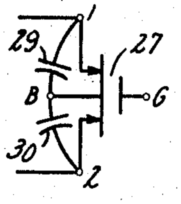
FIGS. 5 and 6 show two methods of compensating for the sensitivity of the MOS transistor in FIG. 2 due to the unconnected base electrode.
Figure 6:
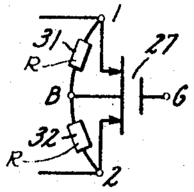

As was previously inferred, one disadvantage of this circuit is a sensitivity of the MOS field-effect transistor 27 to surrounding electrical disturbances which can act on the floating substrate through the disconnected base terminal B and thereby cause spurious action in some part of the control range. This sensitivity can be prevented or avoided by surrounding the device 27 with an electrostatic shield. Another method of preventing spurious action due to the floating substrate is illustrated in FIG. 5 and involves connecting a pair of small capacitors 29 and 30, respectively between the base terminal B and the supply terminals 1 and 2. It has also been found that either one of the capacitors 29 and 30 is sufficient, if desired. The spurious disturbances due to the floating substrate can also be avoided by connecting two resistors 31 and 32 between terminals 1, B, 2, as shown in FIG. 6. Again, either one of the two resistors 31 and 32 is found to be sufficient for this purpose.

Figure 7:
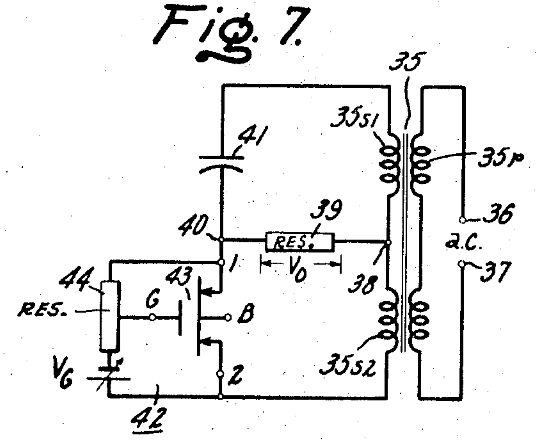
FIG. 7 is a schematic circuit diagram of an AC phase-shift circuit utilizing a linearized MOS transistor as the variable resistance element in a series RC circuit.

Another example of an AC application is the phase-shift circuit shown in FIG. 7, where the variable phasing is accomplished by a voltage which controls the channel resistance of a linearized MOS field-effect transistor. Phase-shift circuits are used on a large scale for controlling thyristors and other devices and is a desirable circuit to illustrate the feasibility of the MOS field-effect transistor as a voltage-controllable linear resistor. The basic phase-shift circuit is known and comprises a transformer 35 whose primary winding 35*p* is connected between a pair of supply terminals 36 and 37 across which an AC voltage is impressed. The secondary winding of the transformer 35 is center tapped to provide two secondary windings 35*s*1 and 35*s*2 whose center tap position 38 is connected through a load resistor 39 to the junction point 40 of a series RC circuit. The series RC circuit is connected across the secondary windings of the transformer 35 and comprises a capacitor 41 and a variable resistance element here indicated generally by numeral 42. The phase position of the output voltage $V_o$ across the output resistor 39 is controlled by the magnitude of the variable resistor 42.

The variable resistance 42 comprises an MOS field-effect transistor 43, which can be any of the various types, having a disconnected base electrode B. A center-tapped resistor or potentiometer 44 is connected in series with a source of adjustable gate voltage $V_G$, and this series circuit is connected across the supply terminals 1 and 2 of the transistor 43. As will be recognized, this arrangement linearizes the channel resistance of the field-effect transistor 43, and the channel resistance can be changed or controlled by varying the gate voltage $V_G$. The variable resistance element 42 comprising the linearized insulated gate field-effect transistor 43 operates efficiently as an AC linear resistor to produce smooth stepless phase shifting of the phase angle between the output voltage $V_o$ and the secondary winding voltage. This AC phase-shift circuit requires less input power (as supplied by the adjustable gate voltage) by many orders of magnitude as compared to previous phase-shift circuits of this type. It will be noted that the variable resistance 42 can be replaced by the circuit shown in FIG. 3 (less the impedance 25), connecting the primary winding 26*p* in series with capacitor 41.

In summary, the channel resistance of an insulated gate field-effect transistor, and preferably a metal-oxide-semiconductor field-effect transistor, is linearized to provide a solid-state voltage-controlled resistance element. The components can be discrete or can be microminiaturized for use in integrated circuits. This is accomplished by applying to the gate electrode, in addition to the gate voltage which determines the degree of conductivity of the field-effect transistor, and therefore its resistance value, an external feedback voltage that is one-half the magnitude of the voltage applied to the supply electrodes at either end of the channel, and that has a polarity opposite to the internal feedback voltage due to the supply voltage to cancel the effect of the same. In some cases, it is necessary to disconnect the base electrode. The linearized insulated gate field-effect transistor can be utilized in DC or AC applications, and requires only a small amount of control power.

While the invention has been particularly shown and described with reference to several preferred embodiments thereof, it will be understood by those skilled in the art that various changes in form and details may be made therein without departing from the spirit and scope of the invention.

I claim:

1. A voltage-controlled linear resistance device comprising:

an insulated gate field-effect transistor having first and second electrodes and a substrate body of semiconductor therebetween providing a channel for charge carrier flow, a gate electrode insulated from and overlying at least a portion of the channel to which a voltage is applied for controlling the conductivity of the channel, and a base electrode on said semiconductor body, means for applying a supply voltage between said first and second electrodes, and a gate voltage between said gate electrode and at least one of said first and second electrodes, an impedance connected between said first and second electrodes, means for coupling the approximate midpoint of said impedance to said gate electrode to thereby apply to the gate electrode an external feedback voltage equal in magnitude to one-half of the supply voltage and opposite in polarity to the internal feedback voltage caused thereby, to thereby nullify the effect of the internal feedback voltage, and a resistor connected directly between said base electrode and one of the first and second electrodes to establish a predetermined semiconductor body potential unaffected by external electrostatic fields, whereby the channel resistance of the insulated gate field-effect transistor is linearized.

2. A device as set forth in claim 1 further including a second resistor connected directly between said base electrode and the other of said first and second electrodes.

3. A voltage-controlled linear resistance device comprising:

an insulated gate field-effect transistor having first and second electrodes and a substrate body of semiconductor therebetween providing a channel for charge carrier flow, a gate electrode insulated from and overlying at least a portion of the channel to which a voltage is applied for controlling the conductivity of the channel, and a base electrode on said semiconductor body, means for applying a supply voltage between said first and second electrodes, and a gate voltage between said gate electrode and at least one of said first and second electrodes, an impedance connected between said first and second electrodes, means for coupling the approximate midpoint of said impedance to said gate electrode to thereby apply to the gate electrode an external feedback voltage equal in magnitude to one-half of the supply voltage and opposite in polarity to the internal feedback voltage caused thereby, to thereby nullify the effect of the internal feedback voltage, and a capacitor connected directly between said base electrode and one of the first and second electrodes to establish a predetermined semiconductor body potential unaffected by external electrostatic fields, whereby the channel resistance of the insulated gate field effect transistor is linearized.

4. A device as set forth in claim 3 further including a second capacitor connected directly between said base electrode and the other of said first and second electrodes.